United States Patent [19]

Inoue

[11] 4,414,028
[45] * Nov. 8, 1983

[54] METHOD OF AND APPARATUS FOR SINTERING A MASS OF PARTICLES WITH A POWDERY MOLD

[75] Inventor: Kiyoshi Inoue, Tokyo, Japan

[73] Assignee: Inoue-Japax Research Incorporated, Yokohama, Japan

[*] Notice: The portion of the term of this patent subsequent to Jun. 16, 1998 has been disclaimed.

[21] Appl. No.: 138,448

[22] Filed: Apr. 8, 1980

[30] Foreign Application Priority Data

| Apr. 11, 1979 | [JP] | Japan | 54-43851 |
| Apr. 16, 1979 | [JP] | Japan | 54-47012 |
| Apr. 19, 1979 | [JP] | Japan | 54-48824 |
| Aug. 31, 1979 | [JP] | Japan | 54-111428 |

[51] Int. Cl.$^3$ .............. B22F 3/16; B22F 3/14; B30B 7/04
[52] U.S. Cl. ................ 419/31; 264/120; 100/232; 425/330; 419/42; 419/44; 419/49; 419/52; 419/53; 419/60
[58] Field of Search .......... 75/226, 214, 200, 223; 100/232; 425/78, 330; 264/120

[56] References Cited

U.S. PATENT DOCUMENTS

| 2,350,971 | 6/1944 | Pecker | 75/214 X |
| 2,449,008 | 9/1948 | Pecker | 425/78 |
| 2,823,419 | 2/1958 | Winters | 75/214 X |
| 2,894,281 | 7/1959 | Pouse | 425/78 |
| 2,968,837 | 1/1961 | Zeitlin | 100/232 |
| 3,093,862 | 6/1963 | Gerard | 425/330 |
| 3,107,395 | 10/1963 | Bundy | 100/232 X |
| 3,249,407 | 5/1966 | Alexander et al. | 75/233 |
| 3,279,917 | 10/1966 | Ballard et al. | 75/226 |
| 3,328,838 | 7/1967 | Zeitlin | 425/330 |
| 3,363,037 | 1/1968 | Levey | 75/226 X |
| 3,384,926 | 5/1968 | Tsujii | 100/232 X |
| 3,450,528 | 7/1968 | Thompson | 75/203 |
| 3,543,345 | 12/1970 | Boyer | 425/78 |
| 3,546,413 | 12/1970 | Ishizuka | 425/330 |
| 3,622,313 | 11/1971 | Havel | 75/226 |
| 3,656,946 | 4/1972 | Inoue | 75/214 X |
| 3,674,403 | 7/1972 | Jonsson | 425/330 |
| 3,779,747 | 12/1973 | Conta | 75/226 X |
| 3,819,814 | 6/1974 | Pope | 75/200 |
| 3,992,200 | 11/1976 | Chandhok | 75/214 X |
| 4,208,174 | 6/1980 | Taricco | 425/78 |
| 4,273,581 | 6/1981 | Inoue | 75/214 |

FOREIGN PATENT DOCUMENTS

| 487114 | 6/1938 | United Kingdom . | |
| 871373 | 6/1961 | United Kingdom . | |
| 1213371 | 11/1970 | United Kingdom . | |
| 1335489 | 10/1973 | United Kingdom . | |
| 1352061 | 5/1974 | United Kingdom . | |
| 1468889 | 3/1977 | United Kingdom . | |
| 1529966 | 10/1978 | United Kingdom . | |
| 562383 | 9/1977 | U.S.S.R. | 425/78 |
| 579100 | 11/1977 | U.S.S.R. | 425/78 |

OTHER PUBLICATIONS

"High-Density Graphite Moldings", Kobayashi et al., *Chemical Abstracts*, vol. 85, 1976, artical No. 9669n.

Primary Examiner—L. Dewayne Rutledge
Assistant Examiner—J. J. Zimmerman
Attorney, Agent, or Firm—Owen, Wickersham & Erickson

[57] ABSTRACT

A particulate mass to be sintered is imbedded in a mold which comprises a porous mass of particulate refractory material enclosed within a flexible membrane. Six press units are provided for applying compressive pressures externally to the mold, together or in sequence, whereby to subject the sinterable mass to pressures in the respective directions, under the control of a preprogrammed control unit which receives clock pulses from a source and stimulates the respective press units. A flexible heating coil imbedded in the mold is supplied with alternating current from a source to inductively heat up the sinterable mass and the adjacent mold material, to enable sintering to occur. The sinterable mass may have been precompacted into a self-supporting so-called "green compact", or it may be supported in a self-supporting shell carried within and forming part of the mold. The mold preferably comprises three layers having characteristics chosen so as to assist in heating up the sinterable mass uniformly.

13 Claims, 7 Drawing Figures

METHOD OF AND APPARATUS FOR SINTERING A MASS OF PARTICLES WITH A POWDERY MOLD

FIELD OF THE INVENTION

The present invention relates generally to a powder-metallurgy or sintering technique and, more particularly, to a method of and apparatus for sintering a mass of particles utilizing a powdery mass of heat-resistant material which constitutes a force-transmitting medium transferring a pressure applied externally to the powdery mass uniformly on the sinterable mass of particles. The term "mass of particles" used herein is intended to include a mass of discrete particles and also a precompacted mass of particles consolidated by a so-called "green compaction", a preliminary sintering technique to enable a mass to be self-supporting.

BACKGROUND OF THE INVENTION

In the traditional powder-metallurgy art, it has long been a practice to heat a precompacted or uncompacted mass of particles to obtain a sintered object therefrom. According to a known process, however, sintered end products of desired quality may not be obtained or certain materials may not lend themselves to satisfactory sintering. In another known sintering technique which is commonly called "hot pressing", a mass of particulate material is placed in a mold such as of graphite and therein compressed between a pair of punches while simultaneously being heated with heating current passing directly through the mass, through the mold or through an induction heating coil arranged to surround the mass and mold. The hot pressing is sometimes carried out with compaction force applied uniformly to the mass peripherally toward central point or axis thereof.

In my copending U.S. Patent Application Ser. No. 27,662 filed Apr. 6, 1979 now U.S. Pat. No. 4,273,581 it has been pointed out that in any of the conventional techniques, a problem has now been recognized that directional variation develops in the quality of a sintered product due to the fact that sintering crystals in the mass are forced to grow with their easy-to-slip surfaces aligned in the direction in which the pressure is applied to the mass. Thus, insufficiencies in the density and lack of uniformity in the quality of sintered products result, this being particularly noticeable where the sintered particles have a tendency to generate a large quantity of gaseous decompositions.

In the aforementioned copending application, there is described an improved method of sintering a mass of particles in which a pressure is applied externally to the mass along a plurality of axes to multi-directionally compress the mass while the mass is being heated by the direct passage of a high-amperage resistive heating current or the inductive application of a heating current through the mass.

OBJECTS OF THE INVENTION

It is an important object of the present invention to provide an improved sintering method which extends the principles disclosed in the aforementioned copending application.

While the method described in the aforementioned copending application represents an marked improvement in the powder-metallurgy in that the problems discussed in the foregoing are substantially overcome, there is much desired as regards the uniform of compression, the quality and performance of end products and the diversity of materials processable in conjunction with the diversity of sinterable shapes.

It is, accordingly, an important object of the present invention to provide an improved sintering method which allows substantially any materials, either metallic or non-metallic, including refractory materials (resistant to fusion, compaction or both) to be sintered relatively easily into practically any shape in a relatively short period of time to yield an excellent sintered product.

Another important object of the present invention is to provide an improved sintering method which is suitable for producing sintered products which are stable at elevated temperatures and suitable for aerospace and atomic energy applications.

A further important object of the present invention is to provide a sintering apparatus for carrying out the method.

SUMMARY OF THE INVENTION

In accordance with the present invention, there is provided a method of sintering a sinterable mass of particles, which method comprises the steps of: imbedding the sinterable mass in a mass of particulate heat-resistant material; applying a pressure externally to the mass of particulate heat-resistant material along a plurality of axes intersecting generally at a point in the sinterable mass, each axis extending generally orthogonally to adjoining axes, to multi-directionally compress the sinterable mass through the mass of particulate heat-resistant material; and applying a sintering heat to the sinterable mass.

BRIEF DESCRIPTION OF DRAWING

The present invention will better be understood from the following description of certain embodiments thereof, reference being made to the accompanying drawing in which.

SPECIFIC DESCRIPTION

Figure 1:
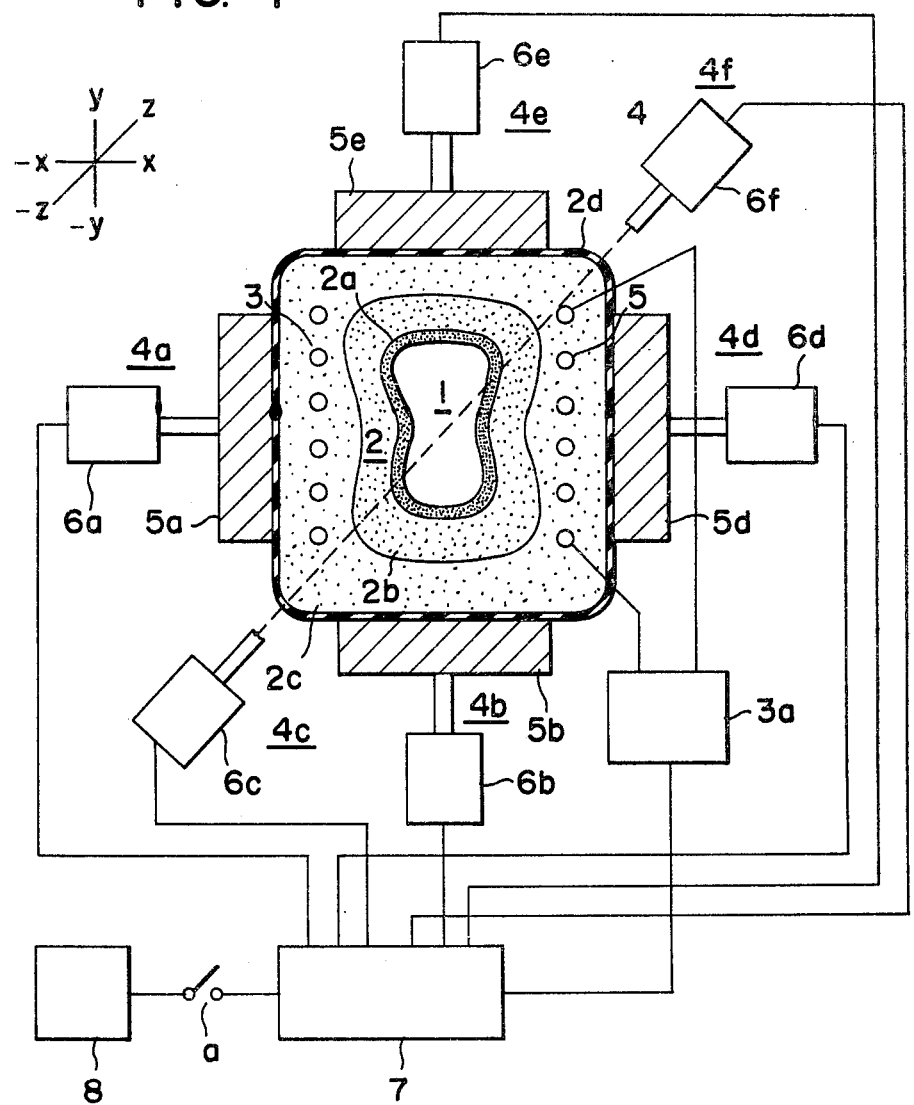
FIG. 1 is a sectional view diagrammatically illustrating an apparatus for sintering a mass of particles, including, in accordance with the invention, a powder mass of heat-resistant material, means for multi-directionally compressing the sinterable mass through the intermediary of the powdery mass constituting the pressure-transmitting medium and means for applying a sintering heat to the sinterable mass.

Referring to FIG. 1 which diagrammatically illustrates an embodiment of the present invention, a sinterable mass of particles 1 which may be precompacted to form a so-called "green compact" is shown imbedded in a mass of heat-resistant material 2 which comprises, for example, three layers 2a, 2b and 2c. The innermost layer 2a in contact with the sinterable mass 1 may be composed of a heat-resistant material of reasonable electric conductivity, for example, graphite. The second or intermidiary layer 2b may be composed of a refractory, heat-resistant material of properties of high thermal and electrical insulation, for example, one or more of magnesia, alumina, silica, zirconia and the like ceramics or metal oxides, or a clay containing in a large proportion one or more of these materials and disposed so as to surround the innermost layer 2a. The third or outermost layer 2c may be composed of a heat-resistant material, for example, graphite, zirconia, alumina or a mixture thereof and disposed so as to surround the second or intermediary layer 2b. Within the outermost powdery layer 2c there is imbedded an induction heating coil 3 connected to an externally arranged high-frequency power supply 3a of customary design. The coil 3 is disposed in the mass 2c so that heat may be inductively generated directly through the sinterable mass 1 or preferentially in the innermost layer 2a, depending on the electric resistivity of the sinterable mass 1, with the heat eventually applied to the mass 1 for sintering. As the temperature within the mass 1 or 2 raises, the layer 2b and further the layer 2c may become electrically conductive to enable these layers as well to carry the induction-heating current, thus constituting an additional heating environment.

A flexible membrane 2d may be used to enclose the outermost powdery layer 2c and further flexible membranes (not shown) may be interposed between neighboring powdery layers 2a and 2b, and 2b and 2c. The coil 3 should be composed and configured to be deformable to some extent under an elevated external pressure applied in the manner being described.

The sinterable mass 1 when in the form of a green compact may be prepared in any of various manners. As is typically the case, a mass of discrete particles may be loaded in a solid mold and there compressed to form the precompact. Divided masses precompacted in separate molds may be assembled together to form the precompact of a desired shapes. The mass 1 may also be of discrete particles and the mass 2 should then be precompacted by using an original mold of wood, plastic or clay to form a mold imparting a desired shape to the mass 1 of discrete particles when loaded therein. A preshaped mass 1 may also be prepared by consolidating sinterable particles with a resinous binder.

The multi-axial compression of the sinterable mass 1 imbedded in the powdery mold 2 in accordance with the present invention is effected by a plurality of independent presses, here shown by six press units 4a, 4b, 4c, 4d, 4e and 4f for applying a pressure to the mass 2 along $+x$, $+y$, $+z$, $-x$, $-y$ and $-z$ axes, respectively. Each of the press units comprises a punch designated at 5a, 5b, 5d and 5e and a hydraulic or oil-pressure cylinder arrangements designated at 6a, 6b, 6c, 6e and 6f with each cylinder when actuated advancing the punch against the powdery mold 2 which transfers the pressure on the sinterable mass 1. In this case, press units 4a and 4d constitute a pair to compress the mass 2 therebetween along $+x/-x$ aces. Likewise, press units 4b and 4e, and press unit 4c and 4f constitute pairs to compress the mass 2 therebetween along $+y/-y$ axes and $+z/-z$, respectively. Axes $+x/-x$, $+y/-y$ and $+z/-z$ lie orthogonal to one another and intersect at a point in the mass 1.

For effecting the selective control or actuation of the plural independent presses 4a, 4b, 4c, 4d, 4e and 4f there is provided a control unit 7 designed to furnish the cylinder units 6a, 6b, 6c, 6d, 6e and 6f individually with drive signals to control the compression force and time along the individual axes. The control unit 7 is also designed to furnish a control signal to the heating power supply 3a and energized by a source of electrical pulses 8 via a switch 9. When the switch 9 is closed, the source 8 provides the unit 7 with clock pulses which enable it to furnish control signals to the heating source 3a on one hand and to drive signals to the press units 4a to 4f on the other hand. The cylinder units 6a to 4f are thus actuated to drive the punches 5a to 5f in a manner preprogrammed in the control unit 7 as regards the directions of compression and the punch position along each direction.

Thus in operation, the $+x/-x$ axes press units 4a and 4d may first be actuated to compress the mass 1 via the force-transmitting powdery mold 2 under a given initial pressure. With the switch 9 closed, the clock pulser 8 provides drive pulses to the control unit 7 which selectively transmits them to the cylinder units 6a and 6d to advance the punches 5a and 5d until the incremental drive reaches a predetermined displacement defined by the corresponding number of drive pulses counted at the control unit 7. At this stage, the power supply 3a has already been actuated to energize the induction coil 3 thereby applying a sintering heat to the mass 1. This simultaneous heating and initial compression serves to activate the particulate mass 1 by stripping impurities and gaseous substances adherent on individual particles and releasing them from the particle-particle interfaces in the mass 1. Mutual intimate contacts between the adjacent particles are thus established and the shrinkage of the mass 1 commences. With the progress of interparticle diffusion, the mass 1 will become ready for plastic deformation so that the continued compression by the punches 5a and 5d gives rise to a sudden shrinkage of the mass 1, followed by the corresponding deformation of the powdery mold 2, when a predetermined threshold condition is reached. The stage of the control unit 7 is then switched to cease drive pulses to the cylinders 6a and 6d while channeling them into a next pair of cylinders, say, cylinders 6b and 6e to cause the mass 1 to be compressed through the mass 2 along the $+y/-y$ axes. The compression of the mass 1 along the $+y/-y$ axes continues for a predetermined time period or until a predetermined number of drive pulses are counted by the control unit 7 and channeled into a next pair of cylinders, say, 6c and 6f. Thus, the plural press units 4a, 4b, 4c, 4d, 4e and 4f are successively actuated so as to successively switch the direction in which the mass 1 is compressed through the mass 2 as in the order of $+x/-x\rightarrow+y/-y\rightarrow+z/-z$. In this successive compression stage, the pressure may be an elevated pressure substantially higher than the initial pressure and may be successively increased as the cycle of successive compression advances.

The multi-axial successive compression effected in this manner following a sudden shrinkage of the sinterable mass 1 and the corresponding shrinkage of the powdery mold 2 allows a sintered mass of high quality with favorable random crystal orientation to result. By successively changing the direction in which the mass is compressed, material flow is effected multi-directionally and randomly in a unit area or volume of the mass with violent flow directional changes each time the compression direction is altered to allow firm interparticle bonds to be established to increase the sintering strength and density.

Gases released from the sintering mass 1 diffuse through the powdery mold or pressure-transmitting particles 2 which forms a porous layer while the latter layer transfers the pressure applied externally by the multi-directional compression system uniformly on the sintering mass 1.

Controlling the positions of individual punches 5a to 5f during the sintering process to conform to the desired shape allows achievement of an increased precision of the sintered product. The time control of compression stroke along each axis is also desirable, in conjunction with each punch position, such that the shape of the powdery mold, hence, the desired sintering shape may be precisely followed to avoid nonuniformity in force transmission which could result in a damage or breakdown of the powdery mold 2.

The induction of the sintering current directly through the sinterable mass 1 by passing a high-frequency AC or pulsed current through the coil 3 from the power supply 3a allows effective heating of the mass 1 by virtue of the fact that the latter is enclosed by the powdery mold of refractory material 2 which serves as a thermal insulater, thus acting against the outward leakage of the heat generated. Refractory and electrically conductive material or graphite is used for the innermost powdery molding layer 2a to serve as an additional passage for the induction current so that heat (Joule heating) is generated both interior or in the direct environment of the sinterable mass 1. The practical elimination of the temperature gradient between the peripheral and interior regions of the mass allows uniform heating over the entire body thereof. Outer refractory and thermally and electrically insulative layers 2b and 2c composed of, say, alumina or zirconia are used to avoid leakage of the induction current and outward emission of the Joule heat. Thus a highly efficient and stabilized heating process ensues. The induction heating coil 3 is of reasonable flexibility so that the sufficient compression by the punches 5a to 5f may not be impeded.

After completion of the sintering process, the sintered product is removed from the powdery mold 1 which, because of its refractivity and having only loosely been consolidated, can readily be destructed by a light impact or vibration.

Figure 2:
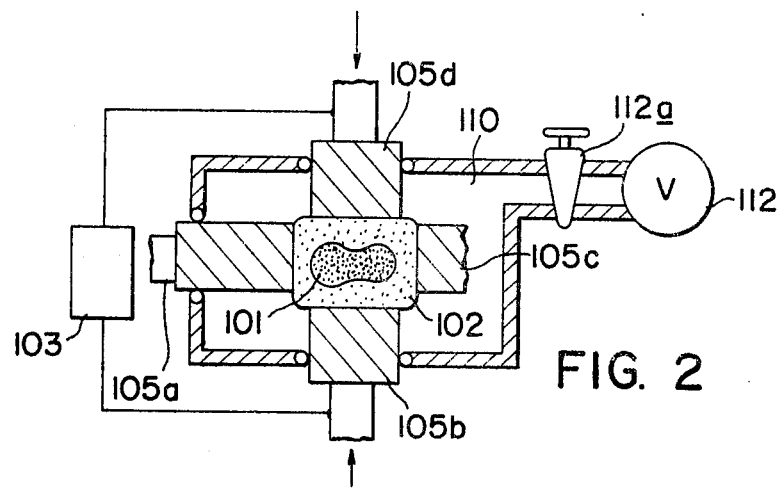
FIG. 2 is a sectional view diagrammatically illustrating an embodiment of the present invention, including means for facilitating interparticle bonds in the sinterable mass.

FIG. 2 shows a further embodiment of the present invention in which a sinterable mass 101 of electrically conductive particles, i.e. metallic or of graphite, is imbedded in a porous powdery mold 102 which is disposed within a sintering chamber 110. The powdery mold 102 is held in multi-directional pressure-receiving relationship with a plurality of press punches, preferably six, of which fours 105a, 105b, 105c and 105d are shown, to transfer the pressure on the sinterable mass 101 while the latter is subjected to sintering heat as previously described. Although induction heating as described previously can be employed here as well, in this embodiment, a direct heating system is employed. To this end, punches 105b and 105d serve also as a pair of electrodes and the powdery mold 2 is composed of an electrically conductive particulate material of sufficient refractivity to resist fusion-bonding while serving to carry a heating current for direct passage between the punch electrodes 105b and 105d through the sinterable mass 1 from a power supply 103 disposed outside the sintering chamber 110. The sintering chamber 110 communicates through a valve 112a with a vacuum pump 112, e.g. diffusion pump.

The vacuum pump 112 is used to evacuate the chamber 110 and to maintain the pressure therein at 1 to 50 Torr. The reduced pressure is applied via the porous layer 102 to the sinterable mass 101 imbedded therein to hold the particules of the mass 101 under a corresponding vacuum condition. When an electric potential is applied from the power supply 103 across the electrode punches 105b and 105d through the layer 102 and the mass 101, the vacuum condition allows fine glow discharges uniformly to develop dispersively among particles of the mass 101. The stabilized development of the glow discharges is attained by limiting the output current of the power supply 103 at a suitable value. The ion and electron bombardment accompanying the glow discharges serves to decompose impurities and gases adherent on the individual particles in the mass 101 and to strip them away from the latter. The decomposed products are removed from the particle interstices in the mass 101 and readily released outwardly through the porous layer 102 under vacuum applied by the pump 112. A highly effective surface cleaning and activation of the particles in the mass 1 is thus achieved.

This step of particle activation and cleaning by glow discharges is followed by the successive multidirectional compression of the mass 101 by punches 105a, 105b, 105c and 105d and an increase of the heating power from the power supply 103 through the mass 101 to complete the sintering operation. In this latter stage a substantial improvement in thermal and electrical transportation of materials through particle-to-particle interfaces is observed owing to the fact that particle surfaces have been sufficiently cleaned and activated.

For the preprocessing of the sinterable mass 101, a vacuum environment of 1 to 50 Torr has been found to be suitable as noted previously and a time period of 1 to 60 seconds to be satisfactory to effect a through activation and cleaning the mass 101 particles. By using the foregoing preprocessing, the total sintering period can be reduced to one third the case without such. In addition, the use of a binding material may be eliminated to allow a greater densification of the sintered mass.

The present invention is suitable for sintering both metals and non-metallic materials such as carbon or graphite. A high-quality sintered carbon or graphite can be prepared, in accordance with a further feature of the present invention, by using as its predecessor material a mass of coke which incorporates a chelate compound as a sintering promoter. For the chelate compound, acetoacetic boric chelate and propylene-diamine boric chelate have been found to be particularly suitable to obtain a sintered carbon or graphite of an increased density and strength. For example, a mass of coke of 300 mesh containing 2% by weight tar (with a softening temperature of 200° C.) and 3% by weight acetoacetic boric chelate may be imbedded in a graphite powdery mold. A sintering current of 220 amperes/cm$^2$ is passed through the mold and the mass while a pressure of 450 kg/cm$^2$ is applied via the mold to the mass multidirectionally in the manner previously described. The sintered mass is graphitized and has a density of 2.36 grams/cm$^3$ and crushing strength of 2.1 tons/cm$^2$.

Figure 4:
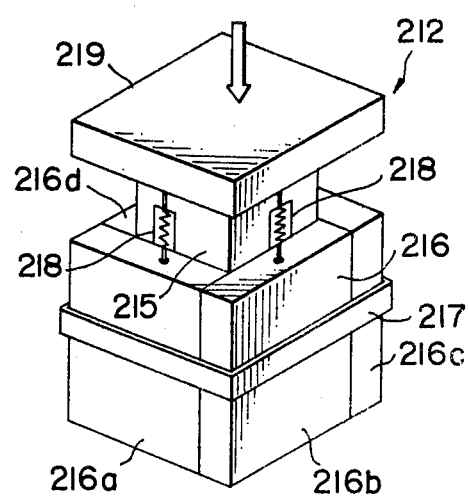
FIG. 4 is a perspective view diagrammatically illustrating a punch arrangement which may be used in the embodiment of FIG. 3.
Figure 5:
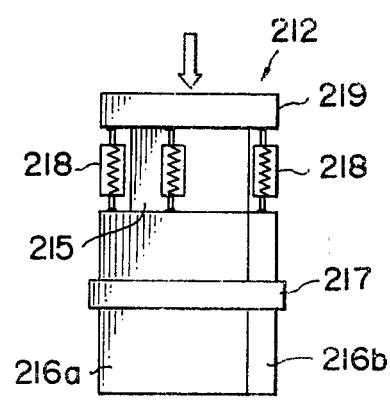
FIG. 5 is an elevational view of the punch arrangement of FIG. 4.
Figure 3:
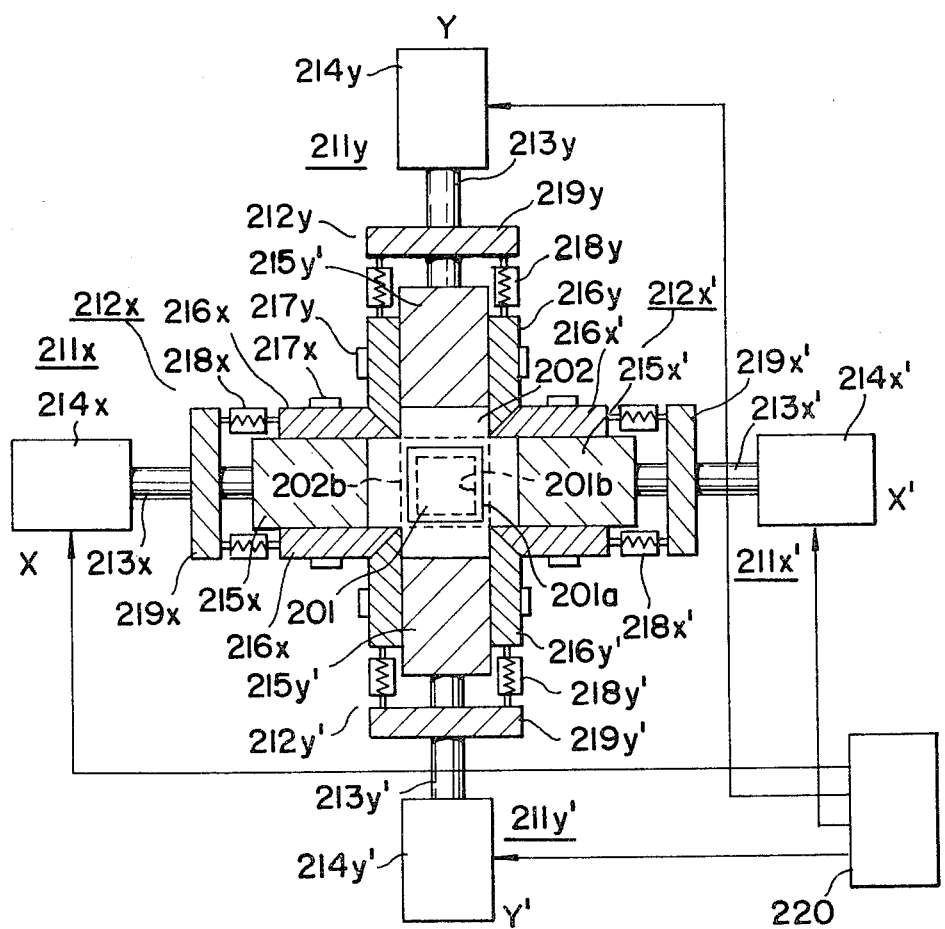
FIG. 3 is a sectional view diagrammatically illustrating an modification of the apparatus of FIG. 1 or 2.

FIG. 3 shows a multi-directional compression system for carrying out the sintering method according to the present invention. This system comprises six axial press units of which four are designated at 211x, 211x', 211y and 211y', the remaining two units (211z and 211z') not shown being arranged in the front and rear sides of the drawing sheet. The press units 211x, 211x', 211y and 211y' comprise punch assemblies 212x, 212x', 212y, 212y'; and pistons 213x, 213x', and 213y and 213y' respectively coupled therewith and driven by hydraulic or oil-pressure cylinders 214x, 214x', 214y and 214y', respectively. The punch assemblies 212x, 212x', 212y, 212y' include main punches 215x, 215x', 215y and 215y' and auxiliary punches 216x, 216x', 216y and 216y', respectively, and are of a structure as more readily apparent from FIGS. 4 and 5. In the latter, the punch assembly in each of the press units 211x, 211x', and 211y and 211y' is generally designated by numeral 212 and the main punch 215 is slidably received in the auxiliary punch 216 which comprises four plates 216a, 216b, 216c and 216d assembled together as shown and held by a ring 217. The plates 216a, 216b, 216c and 216d constituting the auxiliary punch 216 are tied via respective springs 218 to a flange 219 secured to the punch (213x, 213x', 213y, 213y') which carries the main punch 215. The press drive units 214x, 214x', 214y and 214y' are operated by a control unit 220. The additional (fifth and six axial) press unit (211z and 211z') not shown include the respective drives and punch assemblies which are of the same design as those of units 211x, 211x', 211y and 211y' shown and described.

A mass of particles to be sintered is shown at 201 imbedded in a powderly mold of refractory material 202 which is held in compression relation with the plural punch units 211x, 211x', 211y, 211y', 211z and 211z'. The sinterable mass 201 is originally of a contour designated at 201a which is collapsed to a contour designated at 201b as the powdery mold 202 is reached to its final shape 202b as a result of the compressive operation by the multi-axial drive system 211x, 211x', 211y, 211y', 211z and 211z'.

In operation, the cylinders 214x, 214x', 214y, 214y', 214z and 214z' are actuated by the control unit 220 to advance the postons 213x, 213x', 213y, 213y', 213z and 213z' which carry the flanges 219x, 219x', 219y, 219y', 219z and 219z', respectively. The auxiliary punches 216x, 216x', 216y, 216y', 216z and 216z' held by the flanges via the springs 218x, 218x', 218y, 218y', 218z and 218z' are thus advanced to preliminarily shape and compress the powdery mold 202. In this preliminary compression stage, the multiple press units 211x, 211x', 211y, 211y' 211z and 211z are driven simultaneously until the positions of auxiliary punches 216x, 216x', 216y, 216y', 216z and 216z' shown in FIG. 3 is reached to enclose the powdery mold 202 with the end faces of main punches 215x, 215x', 215y, 215y', 215z and 215z' and auxiliary punches 216x, 216x', 216y, 216y', 216z and 216z'.

In the subsequent compression step, the cylinders 214x, 214x', 214y, 214y', 214z and 214z' drive the main punches 215x, 215x', 215y, 215y', 215z and 215z' to compress the mold 202. The auxiliary punches 216x, 216x', 216y, 216y', 216z and 216z' continue to be under driving pressure applied via the springs 218x, 218x', 218y, 218y', 218z and 218z' from the flanges 219x, 219x', 219y, 219y', 219z and 219z' to keep the mold 202 under elevated pressure. At the same time, sintering heat is applied to the mass 201 directly or via the mold 202 as described previously. The multi-directional compression of the mass 101 via the powdery mold 202 is here again carried out in a sequential mode under program stored in the control unit 220. Thus, control signals are applied from the control unit 220 to sequentially actuate the cylinders 214x, 214x', 214y, 214y', 214z and 214z' to drive the main punches 215x, 215x'; 215y, 215y'; and 215z and 215z' successively in an order such. The direction in which the powdery mold is compressed may thus be successively altered such as X,X'→Y,Y'→Z,Z'→X,X'—A precision control of displacement of the punches 215x, 215x', 215y, 215y', 215z and 215z' successively advanced in pairs or otherwise is attained by measuring the position of each corresponding piston 213x, 213x', 213y, 213y', 213z, 213z' driven with an encoder or any of other precision sensors and applying the sensed signals to the control unit 220 for the feed-back control of actuator cylinders 214x, 214x', 214y, 214y', 214z and 214z'.

The control unit 220 also includes a control program for the pressure and time of compression applied for each successive step such that the mass 201 may collapse uniformly over its entire body following the collaption of the mold 202. Instead of driving punches 215x, 215x'; 215y, 215y'; 215z, 215z' in pairs, the punches may also be independent and may be advanced one after another; the control unit 220 may provide six time-divided drive signals which are applied to actuators 214x, 124x', 214y, 214y', 214z and 214z' in succession and cyclically with each signal appointing a preset time and velocity of displacement of each individual punch, hence the rate and extent of collaption of the mass 1 in each of successive direction steps. At a final sintering stage, all punches 215x, 215x', 215y, 215y', 215z and 215z' are preferably driven simultaneously to compress the mass 201 and the mold 202 multi-directionally at an increased pressure in a single step.

Successively switching over the plural independent axes the direction in which the mass 201 is compressed, particulate material flow is effected multidirectionally and randomly in a unit area or volume of the mass with violet flow directional changes each time the compression direction is altered to allow firm interparticle bonds to be established to achieve an increased sintering strength and density.

Figure 7:
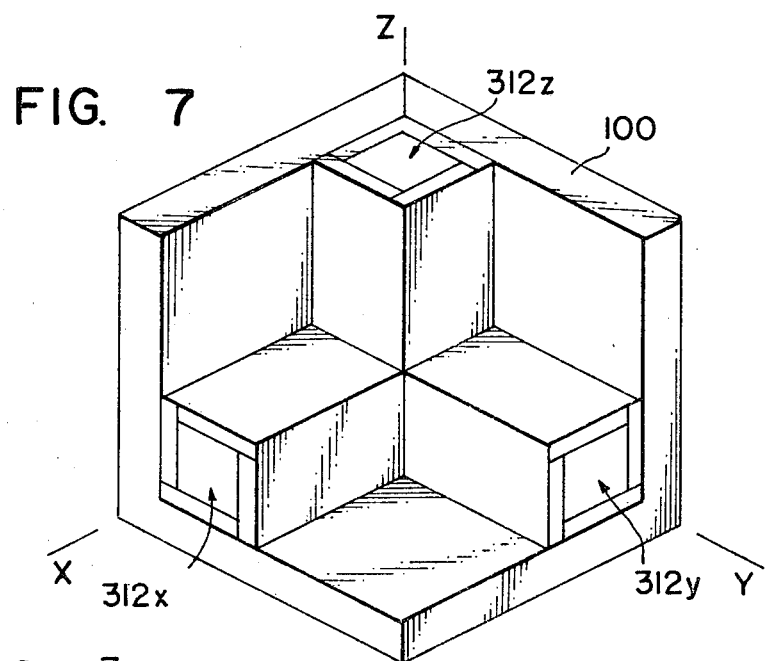
FIG. 7 is a perspective view diagrammatically illustrating a three-axis compression mode of operation in conjunction with the embodiment of FIG. 3.
Figure 6:
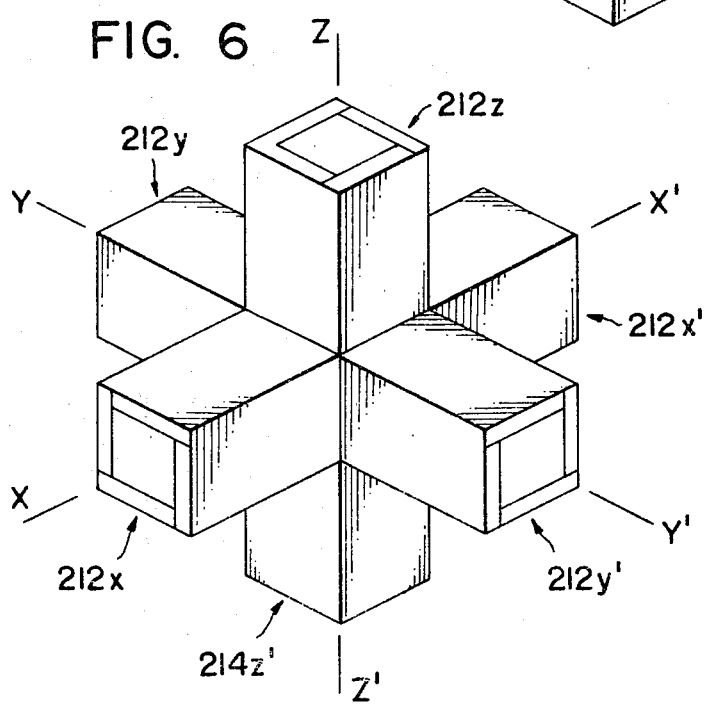
FIG. 6 is a perspective view diagrammatically illustrating a six-axis compression mode of operation in conjunction with the embodiment of FIG. 3.

FIG. 6 shows diagrammatically a six-axis compression system as described in the foregoing. FIG. 7 shows diagrammatically a three-axis compression system in which three punch units 312x, 312y and 312z are used and driven along X, Y and Z axes, respectively, with respect to a fixed or static member 100 which may functionally be substituted by the static punch units which can be driven in X', Y' and Z' axes in the six-axis system of FIG. 6. A powdery mold in which a sinterable mass is imbedded is hidden received by the end faces of the punch assemblies.

There is thus provided an improved method and apparatus for sintering a mass of particles, which overcome the problems encountered by the prior sintering techniques.

What is claimed is:

1. A method of sintering a sinterable mass of particles, comprising the steps of:
   (a) imbedding the sinterable mass in a porous mass of particulate heat-resistant material, said porous mass constituting a force-transmitting medium for transferring pressures uniformly to said sinterable mass,
   (b) disposing said porous mass in pressure-reception relationship in a multi-axial compression system capable of applying plural independent axial pressures externally to said porous mass along a plurality of axes intersecting generally at a point in said sinterable mass, each axis lying generally orthogonal to the adjacent axes, (c) applying thermal energy sufficient for sintering said sinterable mass;

(d) in a first stage of sintering, applying said independent pressures, set at a first magnitude, simultaneously along said axes to multi-directionally compress said sinterable mass through the medium of said porous mass, (e) in a second stage of sintering, applying said independent pressures set at a second magnitude, which is greater than said first magnitude, successively and cyclically along said axes, and (f) in a third and final stage of sintering, applying said independent pressures set at a third magnitude, which is greater than said second magnitude, simultaneously along said axes.

2. The method defined in claim 1 wherein said independent pressures comprise a first pressure applied in a first direction along a first of said axes, a second pressure applied in a second direction along a second of said axes orthogonal to said first direction, and a third pressure applied in a third direction along a third of said axes orthogonal to said first and second directions.

3. The method defined in claim 2 wherein said independent pressures further comprise a fourth pressure applied in a fourth direction coaxial but opposite to said first direction, a fifth pressure applied in a fifth direction coaxial but opposite to said second direction, and a sixth pressure applied in a sixth direction coaxial but opposite to said third direction.

4. The method defined in claim 1 wherein said porous mass of particulate heat-resistant material constitutes a powdery mold defining a final shape of said sinterable mass.

5. The method defined in claim 4 wherein said powdery mold includes a first layer composed of particulate carbon.

6. The method defined in claim 4 wherein said powdery mold includes a second layer composed of one or more in mixture of particulate refractory materials.

7. The method defined in claim 6 wherein said refractory materials include alumina, zirconia, silica, magnesia and graphite.

8. The method defined in claim 6 wherein said powdery mold comprises a first layer in contact with said sinterable mass and composed of particulate graphite, a second layer in contact with said first layer and composed of one or more materials selected from the group which consists of magnesia, alumina, silica and zirconia and a third layer in contact with said second layer and composed of one or more materials selected from the group which consists of graphite, zirconia and alumina.

9. The method defined in claim 1 wherein said sinterable mass comprises a particulate predecessor material of graphite and, when sintered, yields a sintered graphite body, further comprising the step of mixing said predecessor material with a chelate compound and sintering the mixture as said sinterable mass in said porous mass of particulate heat-resistant material.

10. A method of sintering a sinterable mass of particles, comprising the steps of:

(a) imbedding said sinterable mass in a porous mass of particulate heat-resistant material, (b) evacuating the region of said porous mass and passing an electric current through said porous mass so as to cause fine glow discharges uniformly to develop dispersively among particles of the sinterable mass, thereby preconditioning said sinterable mass, and (c) applying thermal energy for sintering to said sinterable mass while simultaneously applying a pressure externally to said mass of particulate heat-resistant material along a plurality of axes intersecting generally at a point in said sinterable mass, each axis lying generally orthogonal to the other said axes, to multi-directionally compress said sinterable mass, said porous mass constituting a force-transmitting medium transferring the pressure uniformly to the glow-discharge-preconditioned sinterable mass.

11. The method defined in claim 10 wherein said sinterable mass comprises a particulate predecessor material of graphite and, when sintered, yields a sintered graphite body, further comprising the step of mixing said predecessor material with a chelate compound and sintering the mixture as said sinterable mass in said porous mass of particulate heat-resistant material.

12. An apparatus for sintering a sinterable mass of particles, comprising:

a mold constituted by a particulate heat-resistant material for receiving said sinterable mass therein;

first drive means for applying a first pressure to said mold in a first direction;

second drive means operative independently of said first drive means for applying a second pressure to said mold in a second direction which is generally orthogonal to said first direction;

third drive means operative independently of said first and second drive means for applying a third pressure to said mold in a third direction which is generally orthogonal to said first and second directions;

control means for operating said first, second and third drive means to effect the application of said first, second and third pressures successively in accordance with a predetermined program stored therein; and means for energizing said mass with a thermal energy to sinter the same within said mold.

13. The apparatus defined in claim 12, further comprising: fourth drive means for applying a fourth pressure to said mold in a fourth direction coaxial but opposite to said first direction, fifth drive means for applying a fifth pressure to said mold in a fifth direction coaxial but opposite to said second direction and sixth drive means for supplying a sixth pressure to said mold in a sixth direction coaxial but opposite to said third direction, said fourth, fifth and six drive means being operated by said control means.

* * * * *

UNITED STATES PATENT AND TRADEMARK OFFICE
CERTIFICATE OF CORRECTION

PATENT NO. : 4,414,028
DATED : November 8, 1983
INVENTOR(S) : Kiyoshi Inoue

It is certified that error appears in the above-identified patent and that said Letters Patent are hereby corrected as shown below:

Column 8, line 29, "direction" should read --directional--.

line 38, "violet" should read --violent--.

Column 9, line 46, "claim 6" should read --claim 4--.

Signed and Sealed this

Twenty-fourth Day of April 1984

[SEAL]

Attest:

GERALD J. MOSSINGHOFF

Attesting Officer   Commissioner of Patents and Trademarks